Aug. 20, 1946.        A. J. ROSENBERGER        2,405,979
PRESSURE REPRODUCING INSTRUMENT
Filed March 22, 1943
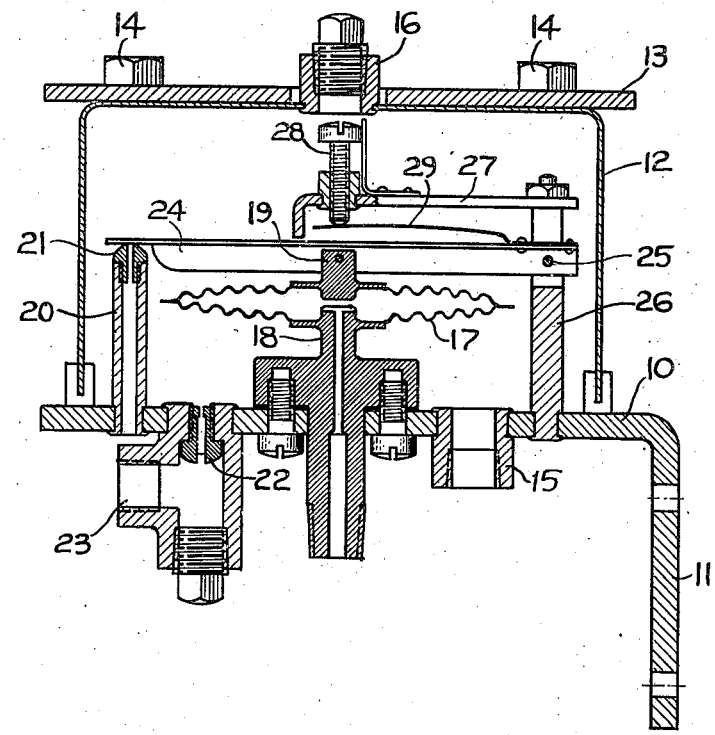
Inventor
ALBERT J. ROSENBERGER
by Lawson Ooms & Booth
Attorneys Patented Aug. 20, 1946

2,405,979

UNITED STATES PATENT OFFICE 2,405,979

PRESSURE REPRODUCING INSTRUMENT

Albert J. Rosenberger, Chicago, Ill., assignor to Republic Flow Meters Company, Chicago, Ill., a corporation of Illinois Application March 22, 1943, Serial No. 480,048

2 Claims. (Cl. 137—153)

This invention relates to pressure reproducing instrument and more particularly to instruments for reproducing fluid pressures for transmission to remote points.

In measuring pressures or differetial pressures of fluids, it is frequently desirable to transmit the pressure to some distant point for actuation of an indicating instrument. In the case of fluids which are noxious, explosive or corrosive, it is not desirable to conduct the main fluid any substantial distance through conduits or the like and it is, therefore, one of the principal objects of the present invention to provide an instrument which will reproduce in air or other inert fluid the pressure of the primary fluid.

Another object of the invention is to provide a pressure reproducing instrument including a flexible diaphragm in which the pressures on opposite sides of the diaphragm are the same. In this construction, the diaphragm is not subjected to any strain during operation and may be completely sealed.

Another object of the invention is to provide a pressure reproducing instrument which can reproduce a pressure either above or below atmospheric.

Still another object of the invention is to provide a pressure reproducing instrument which can be easily adjusted to reproduce the pressure exactly or to reproduce a pressure varying from the primary pressure by a given differential amount.

A further object of the invention is to provide a pressure reproducing instrument including a diaphragm whose movement is limited to a very small amount.

The above and other objects and advantages of the invention will be more readily apparent from the following description when read in connection with the accompanying drawing, in which the single figure is a sectional view of a pressure reproducing instrument embodying the invention.

The instrument, as shown, comprises a closed casing made up of a base plate 10 having a mounting bracket 11 at one side thereof and sealing against a cup-shaped member 12 to form a hollow closed casing. The cup-shaped member 12 may be held against the base plate by the top plate 13 which is secured to the base plate by elongated bolts 14.

The interior of the casing may be connected to a gauge or indicating instrument at a remote point by a conduit connected to a nipple 15 in the base plate. A similar nipple 16 is shown as mounted in the top of the casing and could be used for connection to a similar indicating instrument if desired.

A diaphragm shown as a sealed flat capsule 17 is mounted in the interior of the casing on the upper end of a hollow post 18 which extends through the base plate 10. As shown, one side of the diaphragm is rigidly secured to the post while the other side carries a connecting member 19 freely movable in the casing as the differential pressure across the diaphragm changes. The hollow post 18 is adapted to be connected to a source of pressure to be reproduced.

The casing is formed with a pair of openings in one of which there is secured a tube 20 projecting into the interior of the casing and terminating in a restricted nozzle orifice 21. The other opening is connected through a restricted orifice 22 with a conduit 23 on the exterior of the casing. The nozzle orifice 21 is adapted to be controlled by a flapper valve shown as a lever 24 pivoted at 25, to a post 26 in the casing with its free end overlying the nozzle 21. The lever is pivotally connected intermediate its length to the connecting member 19 to be moved thereby toward and away from the control orifice as the capsule expands and contracts.

Movement of the lever 24 away from the orifice is limited by a bracket 27 secured to the post 26 with its end overlying and spaced from the lever. The bracket carries an adjusting screw 28 bearing against a leaf spring 29 which is secured to the lever 24 so that by adjustment of the screw 28 the spring 29 will urge the lever toward the control orifice with a variable resilient force.

If a pressure above atmospheric is to be reproduced, a source of actuating fluid such as air under pressure is connected to the tube 20 and the conduit 23 is left open to atmosphere. The pressure to be reproduced is conducted to the interior of the capsule 17 and tends to expand it to move the valve member 24 away from the orifice 21 to reduce the restriction of the orifice. Since the orifice 22 is fixed, the pressure in the casing will increase until it balances exactly the pressure in the capsule, at which time, the valve member 24 will move to a position to maintain the desired balance of pressures. The pressure in the casing is conducted to the gauge or indicating instrument through the conduit 15. Thus the pressure conducted to the remote point is air pressure and the only objectionable fluid is that which is conducted to the interior of the capsule through the post 18. The post and capsule and the necessary connecting piping can be formed of a material which is not affected by the fluid being measured and since the remainder of the system contains only air, it is not necessary to use any special corrosion resisting material.

The adjusting screw 28 and spring 29 are employed to adjust the zero setting of the instrument by applying a bias force to the capsule. If there is any variation in the size of the capsules or in the mounting, this may easily be compensated for by adjusting the screw 28 so that the pressure in the casing will be exactly the same as that on the capsule interior. If desired, however, this mechanism may be utilized to provide unequal pressures on the interior and exterior of the capsule by preloading the capsule to some value other than a balanced neutral condition. In this case, the pressure maintained in the casing will always differ from that in the capsule by a predetermined differential amount, depending upon the adjustment of the spring.

When the pressure to be transmitted is below atmospheric, the tube 20 is vented to the atmosphere and the conduit 23 is connected to a vacuum pump or the like. Adjustment of the valve will permit bleeding of air into the casing through the orifice 21 to relieve the vacuum. Operation of the valve will maintain the pressure in the casing the same as that on the interior of the capsule in the same manner as when a super-atmospheric pressure is employed.

While one embodiment of the invention has been shown and described, it will be understood that this is illustrative only and is not intended to be taken as a definition of the scope of the invention, reference being had for this purpose to the appended claims.

What is claimed is:

1. A pressure reproducing instrument comprising a hollow casing formed with an opening communicating with a source of pressure and an opening communicating with atmosphere, a flexible closed capsule in the casing connected to a source of pressure to be reproduced, a tube in the casing connected to one of the openings and terminating in a control orifice, a valve member in the casing connected to the capsule to be moved thereby and cooperating with the control orifice to vary the flow therethrough, and adjustable resilient means acting between the valve member and a part fixed relative to the casing to bias the valve member in one direction.

2. A pressure reproducing instrument comprising a hollow casing formed with an opening communicating with a source of pressure and an opening communicating with atmosphere, a flat sealed capsule in the casing having one side fixedly supported and its other side free to move, means extending into the casing for connecting the interior of the capsule with a pressure to be reproduced, valve means connected to said other side of the capsule for controlling one of the openings and moved in an opening direction by expansion of the capsule a fixed stop engageable with the valve means to limit expansion of the capsule, and adjustable resilient means acting between the stop and the valve means yieldingly to oppose expansion of the capsule.

ALBERT J. ROSENBERGER.